United States Patent
Aybay

(10) Patent No.: US 8,724,479 B1
(45) Date of Patent: May 13, 2014

(54) METHODS AND APPARATUS FOR DETECTING ERRORS WITHIN A DISTRIBUTED SWITCH FABRIC SYSTEM

(75) Inventor: Gunes Aybay, Los Altos, CA (US)

(73) Assignee: Juniper Networks, Inc., Sunnyvale, CA (US)

( * ) Notice: Subject to any disclaimer, the term of this patent is extended or adjusted under 35 U.S.C. 154(b) by 518 days.

(21) Appl. No.: 13/027,414

(22) Filed: Feb. 15, 2011

(51) Int. Cl.
*G01R 31/08* (2006.01)
*G06F 11/00* (2006.01)
*G08C 15/00* (2006.01)

(52) U.S. Cl.
USPC .......................... 370/242; 370/244; 370/252

(58) Field of Classification Search
USPC .................................. 370/242, 244, 252
See application file for complete search history.

(56) References Cited

U.S. PATENT DOCUMENTS

| | | | |
|---|---|---|---|
| 6,654,923 B1 | 11/2003 | Grenier et al. | |
| 2010/0097943 A1* | 4/2010 | D'Souza et al. | 370/248 |
| 2011/0222534 A1* | 9/2011 | Kurita | 370/389 |
| 2012/0170575 A1* | 7/2012 | Mehra | 370/359 |
| 2012/0170585 A1* | 7/2012 | Mehra et al. | 370/400 |

OTHER PUBLICATIONS

S. Amante et al. "Operations and Maintenance Next Generation Requirements" © The IETF Trust, (Feb. 18, 2008), 22 pages.
P. Pan et al. "Fast Reroute Extensions to RSVP-TE for LSP Tunnels," Standards Track, © The Internet Society (May 2005), 38 pages.

* cited by examiner

*Primary Examiner* — Farah Faroul
(74) *Attorney, Agent, or Firm* — Cooley LLP

(57) ABSTRACT

In some embodiments, an apparatus includes a validation engine configured to receive multiple validation packets from an edge device via multiple data paths from a set of data paths between the validation engine and the edge device. The validation engine is configured to compare a number of validation packets from the multiple validation packets received from the edge device to a number of data paths from the set of data paths to determine an error at a data path from the set of data paths. The validation engine is configured to send an indication of the error at the data path from the set of data paths to the edge device.

20 Claims, 6 Drawing Sheets

METHODS AND APPARATUS FOR DETECTING ERRORS WITHIN A DISTRIBUTED SWITCH FABRIC SYSTEM

BACKGROUND

Some embodiments described herein relate generally to switch fabric systems, and, in particular, to methods and apparatus for operations, administration and maintenance validation within a distributed switch fabric system.

Some known switch fabric systems include multiple paths between a source device and a destination device. For example, a Clos network can provide multiple paths between an ingress port and an egress port. In such known switch fabric, systems, the traffic (e.g., data packets) can be distributed across these data paths. In such a switch fabric, any given flow, which may be an operations, administration and management/maintenance (OAM) mechanism (e.g., validation process), can be sent to less than all of the data paths. In such a network or switch fabric, the OAM mechanism may fail to detect forwarding failures (if any) on other paths in the network or switch fabric. Thus, such an OAM mechanism aimed at validating such a network or switch fabric may be incapable of validating the various possible paths within the network or switch fabric.

Accordingly, a need exists for an OAM mechanism that can be used to validate the various possible paths within a switch fabric system.

SUMMARY

In some embodiments, an apparatus includes a validation engine configured to receive multiple validation packets from an edge device via multiple data paths from a set of data paths between the validation engine and the edge device. The validation engine is configured to compare a number of validation packets from the multiple validation packets received from the edge device to a number of data paths from the set of data paths to determine an error at a data path from the set of data paths. The validation engine is configured to send an indication of the error at the data path from the set of data paths to the edge device.

DETAILED DESCRIPTION

Figure 1:
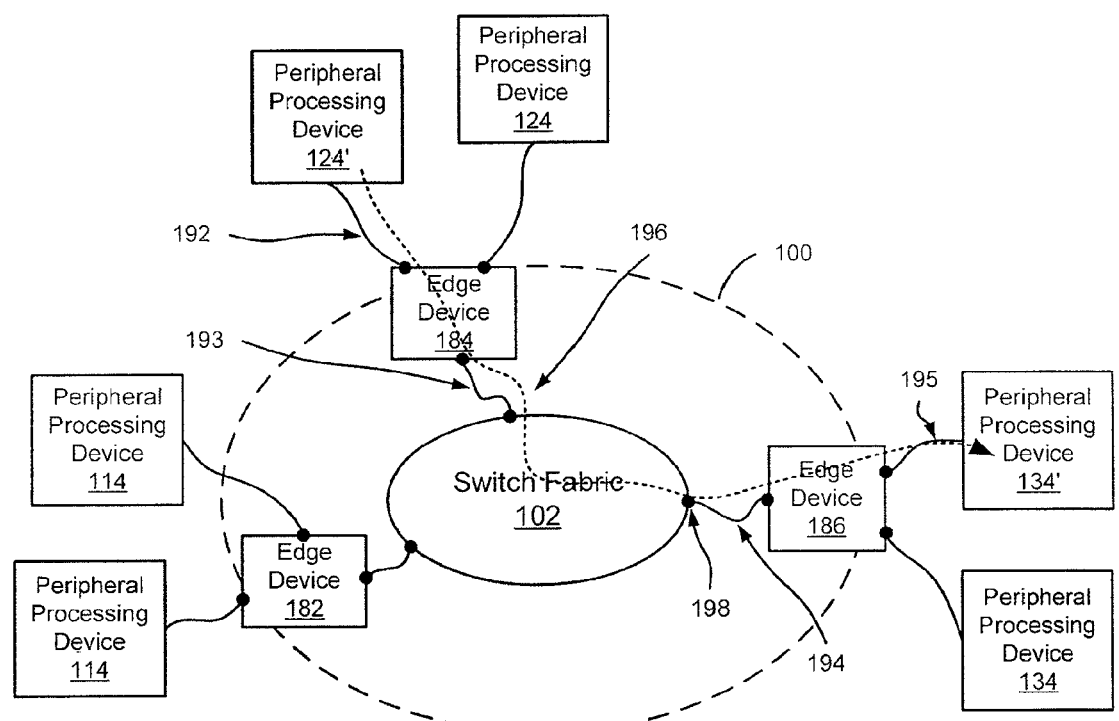
FIG. 1 is a system block diagram of a switch fabric system, according to an embodiment.

In some embodiments, an apparatus includes a validation engine configured to receive multiple validation packets from an edge device via multiple data paths from a set of data paths between the validation engine and the edge device. The validation engine is configured to compare a number of validation packets from the multiple validation packets received from the edge device to a number of data paths from the set of data paths to determine an error at a data path from the set of data paths. The validation engine is configured to send an indication of the error at the data path from the set of data paths to the edge device.

In some embodiments, the data paths are within one or more multi-stage distributed switch fabrics. In some embodiments, one validation packet can be received via each data path from the multiple data paths. More specifically, one validation packet can be configured to validate each data path from the set of data paths. If the number of validation packets from the Multiple validation packets is less than the number of data paths from the set of data paths, not all of the validation packets sent from the second edge device to the first edge device were received at the first edge device. Accordingly, the first edge device can determine that an error exists within at least one of the data paths from the set of data paths. In some embodiments, the error indication includes an indication of which data paths have an error. Based on the error indication, the second edge device can avoid sending data packets to the first edge device via the data paths having errors.

In some embodiments, an apparatus includes a validation engine configured to define a set of packets. The number of validation packets in the set of validation packets is based on a number of data paths between a packet forwarding engine at a first edge device and a second edge device. The validation engine is configured to send each validation packet from the set of validation packets to the packet forwarding engine. The packet forwarding engine is configured to send a validation packet to the second edge device via each data path between the packet forwarding engine and the second edge device. The second edge device validates each data path between the packet forwarding engine and the second edge device based on a number of received validation packets.

In some embodiments, the validation engine can be configured to define a header portion of each validation packet from the set of validation packets to include values (e.g., destination and/or source identifiers) that cause the packet forwarding engine and/or any intermediate modules between the packet forwarding engine and the edge device to route that validation packet to the edge device on a specific path. The validation engine can determine which values to include in the header portions of the validation packets using a reverse hash lookup, a routing table and/or the like.

A non-transitory processor-readable medium stores code that represents instructions to cause a processor to receive, at a first edge device and during a time period, a set of validation packets from a second edge device via multiple data paths from a set of data paths between the first edge device and the second edge device. The non-transitory processor-readable medium stores code that represents instructions to cause the processor to compare a number of validation packets from the set of validation packets to a number of data paths from the set of data paths between the first edge device and the second edge device. The non-transitory processor-readable medium further stores code that represents instructions to cause the processor to send an error indication to the second edge device when the number of validation packets from the set of validation packets is less than the number of data paths from the set of data paths.

As used herein, the term "physical hop" can include a physical link between two modules and/or devices. For example, a data path operatively coupling a first module with a second module can be said to be a physical hop. Similarly stated, a physical hop can physically link the first module with the second module.

As used herein, the term "single physical hop" can include a direct physical connection between two modules in a system. Similarly stated, a single physical hop can include a link via which two modules are coupled without intermediate modules. Accordingly, for example, if a first module is coupled to a second module via a single physical hop, the first module can send data packets directly to the second module without sending the data packets through intervening modules.

As used herein, the term "single logical hop" means a physical hop and/or group of physical hops that are a single hop within a network topology associated with a first protocol. Similarly stated, according to the topology associated with the first protocol, no intervening nodes exist between a first module and/or device operatively coupled to a second module and/or device via the physical hop and/or the group of physical hops. A first module and/or device connected to a second module and/or device via a single logical hop can send a data packet to the second module and/or device using a destination address associated with the first protocol and the second module and/or device, regardless of the number of physical hops between the first device and the second device. In some embodiments, for example, a second protocol can use the destination address of the first protocol to route a data packet and/or cell from the first module and/or device to the second module and/or device, over the single logical hop. Similarly stated, when a first module and/or device sends data to a second module and/or device via a single logical hop of a first protocol, the first module and/or device treats the single logical hop as if it is sending the data directly to the second module and/or device.

In some embodiments, a switch fabric can function as part of a single logical hop (e.g., a single large-scale consolidated L2/L3 switch). Portions of the switch fabric can be physically distributed across, for example, many chassis and/or modules interconnected by multiple physical hops. In some embodiments, for example, a processing stage of the switch fabric can be included in a first chassis and another processing stage of the switch fabric can be included in a second chassis. Both of the processing stages can logically function as part of a single consolidated switch (e.g., within the same logical hop according to a first protocol) but include a separate single physical hop between respective pairs of processing stages within the consolidated switch. Similarly stated, a physical hop can operatively couple each stage within a switch fabric representing a single logical hop associated with a protocol used to route data outside the switch fabric. Additionally, packet classification and forwarding associated with a protocol used to route data outside a single logical hop need not occur at each stage within the single logical hop. In some embodiments, for example, packet classification and forwarding associated with a first protocol (e.g., Ethernet) can occur prior to a module and/or device sending the data packet to another module and/or device via the single logical hop.

As used herein, a module that is within a switch fabric can be, for example, any assembly and/or set of operatively-coupled electrical components that define one or more switches within a stage of a switch fabric. In some embodiments, a module can include, for example, a memory, a processor, electrical traces, optical connectors, software (executing in hardware) and/or the like.

As used herein, an engine can be, for example, a combination of hardware and/or software (executing in hardware). In some embodiments, for example, an engine can include at least a portion of a processing device, such as a field-programmable gate array (FPGA), an application specific integrated circuit (ASIC), a digital signal processor (DSP) and/or the like. Further, in some embodiments, an engine can include code stored in a memory configured to be executed at a processing device. In some embodiments, for example, a validation engine at an edge device can include an FPGA. In other embodiments, a validation engine at an edge device can include code stored in a memory of the edge device and configured to be executed at a processing device of the edge device.

As used in this specification, the singular forms "a," "an" and "the" include plural referents unless the context clearly dictates otherwise. Thus, for example, the term "a switch fabric" is intended to mean a single switch fabric or a combination of switch fabrics.

The terms "first stage", "second stage" and so on refer to portions, modules or nodes within a switch fabric. In some instances, these terms refer to a specific stage within a given switch fabric. For example, a three-stage Clos network includes three consecutive stages from ingress to egress; such a switch fabric has three stages that can be referred to as the "first stage" (the first stage with respect to the ingress to egress direction) through the third stage (the third and final stage with respect to the ingress to egress direction). For example, FIG. 2 refers to specific-stages within a given switch fabric. In other instances, however, the terms "first stage", "second stage" and so on refer to any stage within the switch fabric and correspond to the order of discussion of a given stage. For example, the "first stage" can refer to the first stage discussed and can correspond to any stage within the switch fabric (e.g., the third stage within a three-stage Clos network), and the "second stage" can refer to a remaining stage within the switch fabric (e.g., the second stage within the three-stage Clos network). Thus, it should be understood that the specific context will indicate whether the terms "first stage", "second stage" and so on can refer to a specific ordinal stage within a switch fabric or can refer to any particular stage within the switch fabric.

FIG. 1 is a schematic diagram that illustrates a switch fabric system 100, according to an embodiment. The switch fabric system 100 includes a switch fabric 102 and multiple edge devices 182, 184, 186. The switch fabric system 100 operatively couples multiple peripheral processing devices 114, 124, 134 to each other. The peripheral processing devices 114, 124, 134 can be, for example, compute nodes, service nodes, routers, and storage nodes, as described in further detail herein. In some embodiments, for example, the peripheral processing devices 114, 124, 134 include servers, storage devices, gateways, workstations, and/or the like.

The peripheral processing devices 114, 124, 134 can be operatively coupled to the edge devices 182, 184, 186 of the switch fabric system 100 using any suitable connection such as, for example, an optical connection (e.g., an optical cable and optical connectors), an electrical connection (e.g., an electrical cable and electrical connectors) and/or the like. As such, the peripheral processing devices 114, 124, 134 are configured to send data (e.g., data packets, data cells, etc.) to the switch fabric system 100 via the edge devices 182, 184, 186. In some embodiments, the connection between the peripheral processing devices 114, 124, 134 and the edge devices 182, 184, 186, respectively, is a direct link. Such a link can be said to be a single physical hop link. In other embodiments, the peripheral processing devices can be operatively coupled to the edge devices via intermediate modules. Such a connection can be said to be a multiple physical hop link.

Each edge device 182, 184, 186 can be any device configured to operatively couple peripheral processing devices 114, 124, 134 to the switch fabric 102. In some embodiments, for example, the edge devices 182, 184, 186 can be access switches, input/output modules, top-of-rack devices and/or the like. Structurally, the edge devices 182, 184, 186 can function as both source edge devices and destination edge devices. Accordingly, the edge devices 182, 184, 186 can send data (e.g., a data stream of data packets and/or data cells) to and receive data from the switch fabric 102, and to and from the connected peripheral processing devices 114, 124, 134.

In some embodiments, the edge devices 182, 184, 186 can be a combination of hardware modules and software modules (executing in hardware). In some embodiments, for example, each edge device 182, 184, 186 can include a field-programmable gate array (FPGA), an application specific integrated circuit (ASIC), a digital signal processor (DSP) and/or the like.

The edge devices 182, 184, 186 can be configured to prepare a data packet (e.g., an Ethernet packet) to enter the switch fabric 102. For example, the edge devices 182, 184, 186 can be configured to forward, classify, and/or modify the packet encapsulation (e.g., modify, add and/or remove a header portion, footer portion and/or any other identifier included within the data packet) of a data packet prior to sending the data packet to the switch fabric 102. Additional details related to packet classification are described in U.S. patent application Ser. No. 12/242,168 entitled "Methods and Apparatus Related to Packet Classification Associated with a Multi-Stage Switch," filed Sep. 30, 2008, and U.S. patent application Ser. No. 12/242,172, entitled "Methods and Apparatus for Packet Classification Based on Policy Vectors," filed Sep. 30, 2008, both of which are incorporated herein by reference in their entireties.

Each of the edge devices 182, 184, 186 is configured to communicate with the other edge devices 182, 184, 186 via the switch fabric 102. Specifically, the switch fabric 102 is configured to provide any-to-any connectivity between the edge devices 182, 184, 186 at relatively low latency. For example, switch fabric 102 can be configured to transmit (e.g., convey) data between edge devices 182, 184, 186. In some embodiments, the switch fabric 102 can have at least hundreds or thousands of ports (e.g., egress ports and/or ingress ports) through which edge devices 182, 184, 186 can transmit and/or receive data. As described in further detail herein, each edge device 182, 184, 186 can be configured to communicate with the other edge devices 182, 184, 186 over multiple data paths. More specifically, in some embodiments, multiple data paths exist, within the switch fabric 102, between a first edge device (e.g., 184) and a second edge device (e.g., 186).

The edge devices 182, 184, 186 can include one or more network interface devices (e.g., a 40 Gigabit (Gb) Ethernet interface, a 100 Gb Ethernet interface, etc.) through which the edge devices 182, 184, 186 can send signals to and/or receive signals from the switch fabric 102. The signals can be sent to and/or received from the switch fabric 102 via an electrical link, an optical link and/or a wireless link operatively coupled to the edge devices 182, 184, 186. In some embodiments, the edge devices 182, 184, 186 can be configured to send signals to and/or receive signals from the switch fabric 102 based on one or more protocols (e.g., an Ethernet protocol, a multi-protocol label switching (MPLS) protocol, a Fibre Channel protocol, a Fibre-Channel-over Ethernet protocol, an Infiniband-related protocol, a cell-based protocol, etc.).

The switch fabric 102 can be any suitable switch fabric that operatively couples the edge devices 182, 184, 186 to the other edge devices 182, 184, 186 via multiple data paths. In some embodiments, for example, the switch fabric 102 can be a Clos network (e.g., a non-blocking Clos network, a strict sense non-blocking Clos network, a Benes network) having multiple stages of switching modules (e.g., integrated Ethernet switches). In some embodiments, for example, the switch fabric 102 can be similar to the three-stage switch fabric 200 shown in FIG. 2 and described in further detail herein. In other embodiments, the switch fabric 102 shown in FIG. 1 can include any number of stages. In such embodiments, for example, the switch fabric 102 can include five, seven or nine stages. The switch fabric 102 can be, for example, part of a core portion of a data center similar to the core portion of the data center described in co-pending U.S. patent application Ser. No. 12/495,337, filed Jun. 30, 2009, and entitled "Methods and Apparatus Related to Any-to-Any Connectivity Within a Data Center," which is incorporated herein by reference in its entirety.

In some embodiments, the switch fabric 102 can be (e.g., can function as) a single consolidated switch (e.g., a single large-scale consolidated L2/L3 switch). In other words, the switch fabric 102 can be configured to operate as a single logical entity (e.g., a single logical network element). Similarly stated, the switch fabric 102 can be part of a single logical hop between a first edge device 182, 184, 186 and a second edge device 182, 184, 186 (e.g., along with the data paths between the edge devices 182, 184, 186 and the switch fabric 102). The switch fabric 102 can be configured to connect (e.g., facilitate communication between) the peripheral processing devices 114, 124, 134. In some embodiments, the switch fabric 102 can be configured to communicate via interface devices (not shown) configured to transmit data at a rate of at least 10 Gb/s. In some embodiments, the switch fabric 102 can be configured to communicate via interface devices (e.g., fibre-channel interface devices) configured to transmit data at a rate of, for example, 2 Gb/s, 4, Gb/s, 8 Gb/s, 10 Gb/s, 40 Gb/s, 100 Gb/s and/or faster link speeds.

Although the switch fabric 102 can be logically centralized, the implementation of the switch fabric 102 can be highly distributed, for example, for reliability. For example, portions of the switch fabric 102 can be physically distributed across, for example, many chassis. In some embodiments, for example, a processing stage of the switch fabric 102 can be included in a first chassis and another processing stage of the switch fabric 102 can be included in a second chassis. Both of the processing stages can logically function as part of a single consolidated switch (e.g., within the same logical hop) but have a separate single physical hop between respective pairs of processing stages. More details related to architecture of the switch fabric 102 are described herein.

In use, a data packet (e.g., an Ethernet packet) can be sent between peripheral processing devices 114, 124, 134 via remaining portions of the switch fabric system 100. For example, a data packet can be sent from a first peripheral processing device 124' to a second peripheral processing device 134' via path 196. The first peripheral processing device 124' can send the data packet to the edge device 184 via link 192. The edge device 184 can then prepare the data packet to enter the switch fabric 102. Once prepared, the edge device 184 sends the data packet to the switch fabric 102 via link 193. The switching modules within the switch fabric 102 can route the data packets through the switch fabric 102 via one or more of the multiple paths within the switch fabric 102. The data packet is sent through port 198 to the edge device 186 via link 194. The edge device 186 can then send the data packet to the second peripheral processing device 134' via link 195.

Figure 2:
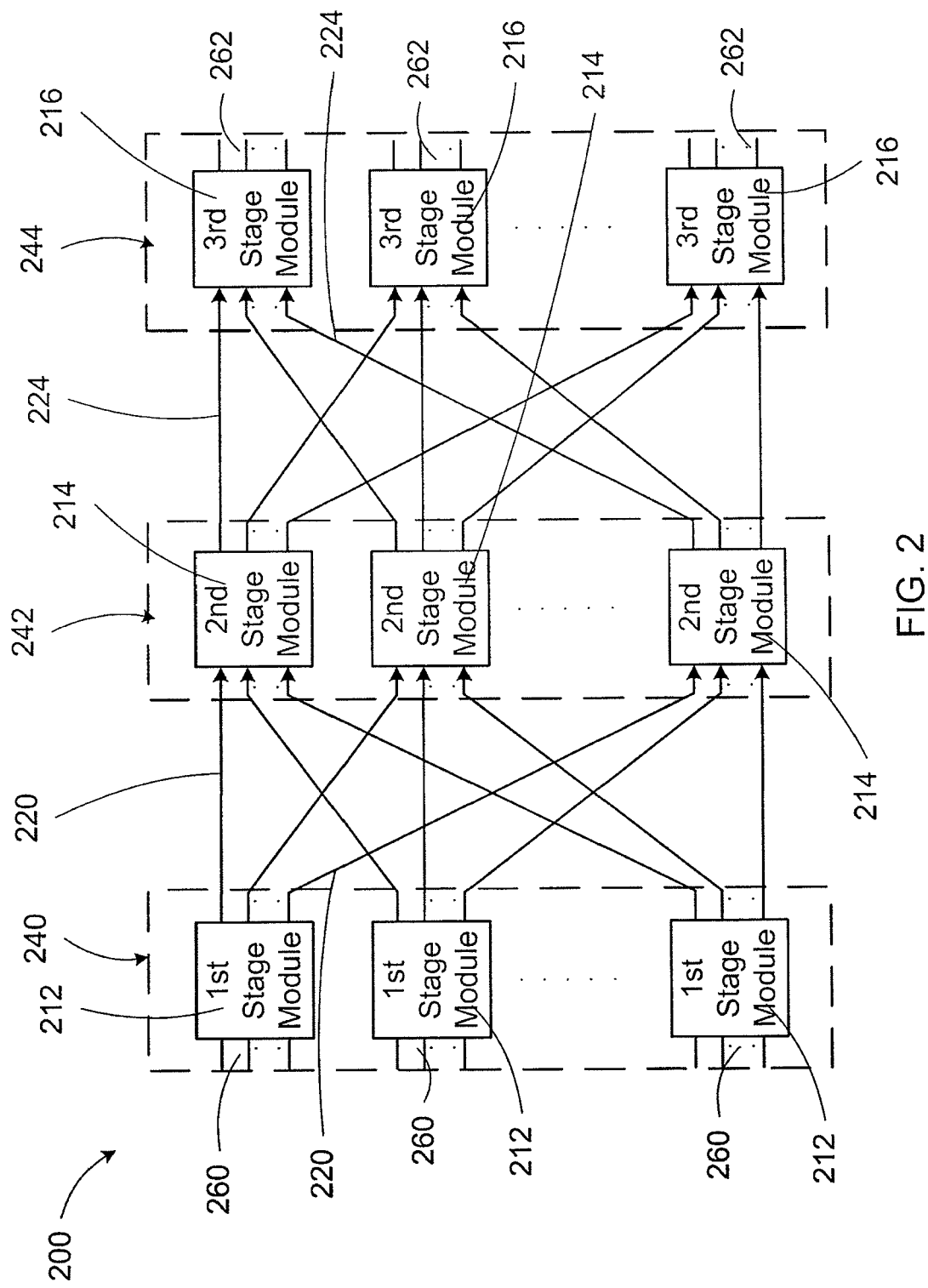
FIG. 2 is a schematic illustration of a switch fabric, according to another embodiment.

FIG. 2 is a schematic illustration of a switch fabric 200, according to an embodiment. The switch fabric 200 can include multiple physical hops that are within a single logical hop. Switch fabric 200 is a three-stage, non-blocking Clos network and includes a first stage 240, a second stage 242, and a third stage 244. The first stage 240 includes modules 212. Each module 212 of the first stage 240 is an assembly of electronic components and circuitry. In some embodiments, for example, each module is an application-specific integrated circuit (ASIC). In other embodiments, multiple modules are contained on a single ASIC or a single chip package. In still other embodiments, each module is an assembly of discrete electrical components.

In some embodiments, each module 212 of the first stage 240 is a switch (e.g., a packet switch, a frame switch, an integrated Ethernet switch and/or a cell switch). The switches are configured to redirect data (e.g., data packets, data cells, etc.) as it flows through the switch fabric 200. In some embodiments, for example, each switch includes multiple input ports operatively coupled to write interfaces on a memory buffer (not shown in FIG. 2). Similarly, a set of output ports are operatively coupled to read interfaces on the memory buffer. In some embodiments, the memory buffer can be a shared memory buffer implemented using on-chip static random access memory (SRAM) to provide sufficient bandwidth for all input ports to write one incoming cell (e.g., a portion of a data packet) or data packet per time period (e.g., one or more clock cycles) and all output ports to read one outgoing cell or data packet per time period. Each switch operates similar to a crossbar switch that can be reconfigured subsequent each time period.

Each module 212 of the first stage 240 includes a set of input ports 260 configured to receive data (e.g., a signal, a cell of a packet, a data packet, etc) as it enters the switch fabric 200. For example, each input port 260 can be coupled to an edge device (e.g., edge devices 182, 184, 186 shown and described with respect to FIG. 1). Accordingly, an edge device can send data to the switch fabric via the input ports 260. In this embodiment, each module 212 of the first stage 240 includes the same number of input ports 260.

Similar to the first stage 240, the second stage 242 of the switch fabric 200 includes modules 214. The modules 214 of the second stage 242 are structurally similar to the modules 212 of the first stage 240. Each module 214 of the second stage 242 is operatively coupled to each module 212 of the first stage 240 by a data path 220. Each data path 220 between a given module 212 of the first stage 240 and a given module 214 of the second stage 242 is configured to facilitate data transfer from the modules 212 of the first stage 240 to the modules 214 of the second stage 242.

The data paths 220 between the modules 212 of the first stage 240 and the modules 214 of the second stage 242 can be constructed in any manner configured to facilitate data transfer from the modules 212 of the first stage 240 to the modules 214 of the second stage 242. In some embodiments, for example, the data paths 220 are optical connectors between the modules. In other embodiments, the data paths are within a midplane. Such a midplane can be similar to that described in U.S. application Ser. No. 12/345,500, filed Dec. 29, 2008, and entitled "System Architecture for a Scalable and Distributed Multi-Stage Switch Fabric," which is incorporated herein by reference in its entirety. Such a midplane can be used to connect each module of the second stage with each module of the first stage. In still other embodiments, two or more modules are contained within a single chip package and the data paths are electrical traces.

In some-embodiments, the switch fabric 200 is a non-blocking Clos network. Thus, the number of modules 214 of the second stage 242 of the switch fabric 200 varies based on the number of input ports 260 of each module 212 of the first stage 240. In a rearrangeably non-blocking Clos network (e.g., a Benes network), the number of modules 214 of the second stage 242 is greater than or equal to the number of input ports 260 of each module 212 of the first stage 240. Thus, if n is the number of input ports 260 of each module 212 of the first stage 240 and m is the number of modules 214 of the second stage 242, m≥n. In some embodiments, for example, each module of the first stage has five input ports. Thus, the second stage has at least five modules. All five modules of the first stage are operatively coupled to all five modules of the second stage by data paths. Said another way, each module of the first stage can send data to any module of the second stage.

The third stage 244 of the switch fabric 200 includes modules 216. The modules 216 of the third stage 244 are structurally similar to the modules 212 of the first stage 240. The number of modules 216 of the third stage 244 is typically equivalent to the number of modules 212 of the first stage 240. Each module 216 of the third stage 244 includes output ports 262 configured to allow data to exit the switch fabric 200. For example, each output port 262 can be coupled town edge device (e.g., edge devices 182, 184, 186 shown and described with respect to FIG. 1). Accordingly, an edge device can receive data from the switch fabric via the output ports 262. In this embodiment, each module 216 of the third stage 244 includes the same number of output ports 262. Further, the number of output ports 262 of each module 216 of the third stage 244 is typically equivalent to the number of input ports 260 of each module 212 of the first stage 240.

Each module 216 of the third stage 244 is connected to each module 214 of the second stage 242 by a data path 224. The data paths 224 between the modules 214 of the second stage 242 and the modules 216 of the third stage 244 are configured to facilitate data transfer from the modules 214 of the second stage 242 to the modules 216 of the third stage 244.

The data paths 224 between the modules 214 of the second stage 242 and the modules 216 of the third stage 244 can be constructed in any manner configured to facilitate data transfer from the modules 214 of the second stage 242 to the modules 216 of the third stage 244. In some embodiments, for example, the data paths 224 are optical connectors between the modules. In other embodiments, the data paths are within a midplane. Such a midplane can be used to connect each module of the second stage with each module of the third stage. In still other embodiments, two or more modules are contained within a single chip package and the data paths are electrical traces.

In some embodiments, data can be routed through the switch fabric using hash functions, lookup tables, routing tables and/or the like. For example, a first stage module 212 can determine to which second stage module 214 to send a data packet and/or cell by using header values of the data packet and/or cell as inputs to a hash function. A result of the hash function can be an identifier of a second stage module 214 and the first stage module 212 can send the data packet and/or cell accordingly. Similarly, a second stage module 214 and/or a third stage module 216 can determine to which third stage module 216 or to which edge device (i.e., coupled to an output port 262), respectively, to send the data packet, respectively, using such a hash function, a lookup table and/or a routing table.

Figure 3:
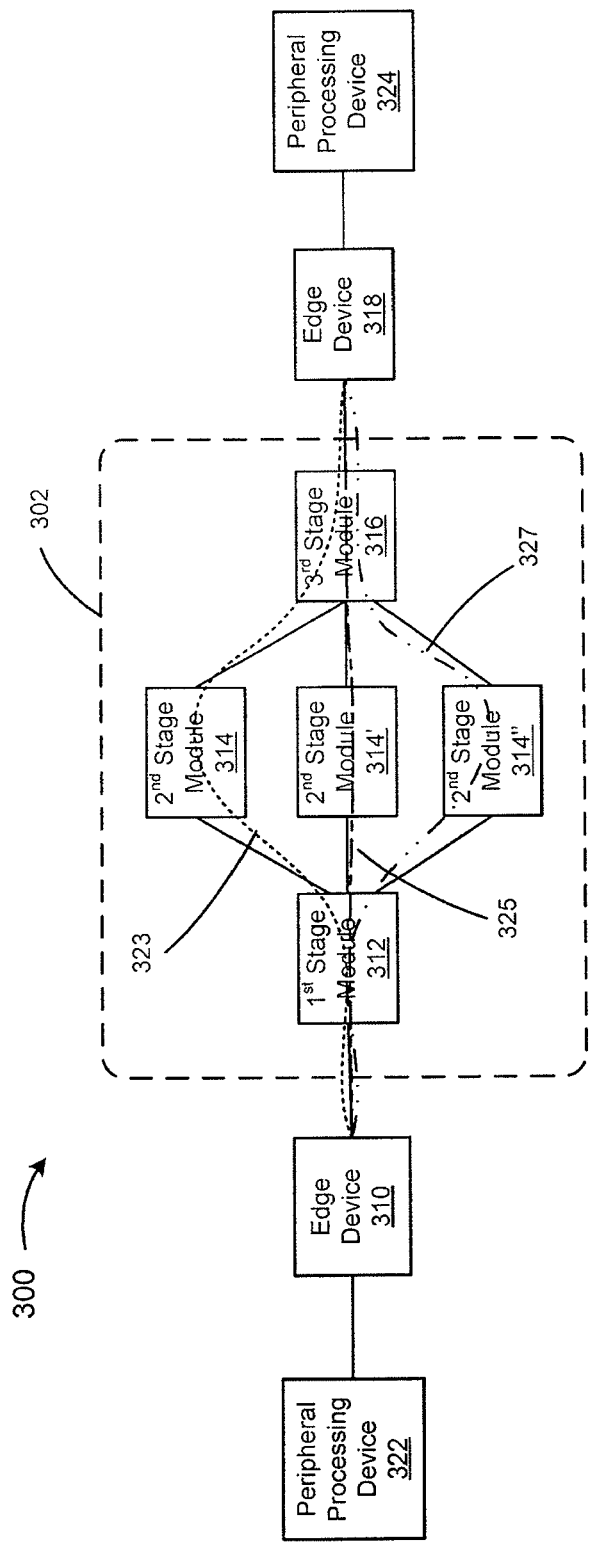
FIG. 3 is a schematic illustration of a portion of a switch fabric system, according to another embodiment.

FIG. 3 is a schematic illustration of a portion of a switch fabric system 300, according to another embodiment. The illustrated portion of the switch fabric system 300 includes a switch fabric portion 302, and a first edge device 310 and a second edge device 318 each operatively coupled to the switch fabric portion 302. The switch fabric system 300 can operatively couple a peripheral processing device 322 to a peripheral processing device 324. FIG. 3 illustrates an example of one configuration of the switch fabric system 300 showing only two edge devices 310, 318 coupled to a single switch fabric portion 302. It should be understood, however, that the switch fabric portion 302 can be connected to various numbers of edge devices. It should also be understood that although only two peripheral processing devices are shown in FIG. 3, the switch fabric system 300 can operatively couple many more peripheral processing devices to each other.

The switch fabric portion 302 can be structurally and functionally similar to the switch fabric 200 (shown and described with respect to FIG. 2). The switch fabric portion 302 includes a first stage module 312, three second stage modules 314, 314' and 314", and a third stage module 316. The first stage module 312 is operatively coupled to each second stage module 314, 314', 314" via separate data paths. Similarly, each second stage module 314, 314', 314" is operatively coupled to the third stage module 316 via a separate data path. The first stage module 312 can be structurally and functionally similar to, for example, first stage modules 212 described above with reference to FIG. 2. In addition, the second stage modules 314, 314', 314" and the third stage module 316 can be structurally and functionally similar to the first stage module 312.

Although the switch fabric portion 302 is shown with a single first stage module 312 coupled to three second stage modules 314, 314', 314" each coupled to a single third stage module 316, it should be understood that the switch fabric portion 302 can include more than one first stage module, less or more than three second stage modules, and/or more than one third stage module. In some embodiments, the switch fabric portion 302 can be fully-interconnected similar to, for example, switch fabric 200, where each module of the first stage is coupled to each module of the second stage and each module of the second stage is coupled to each module of the third stage. In some embodiments, the switch fabric portion 302 may not be fully interconnected. For example, the switch fabric portion 302 can include a second third stage module (not shown) that is only connected to, for example, one or two of the three second stage modules 314, 314', 314".

As illustrated in FIG. 3, in this embodiment, a data packet can be transmitted from the first edge device 310 to the second edge device 318 via a first data path 323 that includes first stage module 312, second stage module 314 and third stage module 316. A data packet can also be transmitted from the first edge device. 310 to the second edge device 318 via a second data path 325 that includes first stage module 312, second stage module 314' and third stage module 316, or a third data path 327 that includes first stage module 312, second stage module 314" and third stage module 316. Thus, FIG. 3 illustrates the three possible paths through the switch fabric system 300 that a data packet can be sent between first edge device 310 and second edge device 318 for this particular example. In alternative embodiments, there can be any number of possible paths between the peripheral processing device 322 and the peripheral processing device 324.

The data paths 323, 325 and 327 include data path connections between the first stage module 312 and the second stage modules 314, 314', 314", and between the second stage modules 314, 314', 314" and the third stage module 316, each of which can be constructed in any manner configured to facilitate data transfer. In some embodiments, for example, the data paths include optical connectors, optical fibers and/or electrical connectors between the modules. In some embodiments, the data paths are within a midplane or a backplane.

The peripheral processing devices 322, 324 can be, for example, compute nodes, service nodes, routers, and storage nodes, as described in further detail herein. In some embodiments, for example, the peripheral processing devices include servers, storage devices, gateways, workstations, and/or the like. The peripheral processing devices 322, 324 can be operatively coupled to the edge devices 310 and 318, respectively, using any suitable connection such as, for example, an optical connection (e.g., an optical cable and optical connectors), an electrical connection (e.g., an electrical cable and electrical connectors) and/or the like. As such, the peripheral processing devices 322, 324 are configured to send data to and receive data from (e.g., data packets, data cells, etc.) the edge devices 310 and 318. For example, the peripheral processing device 322 can be configured to send a data packet to the peripheral processing device 324. Any peripheral processing device operatively coupled to the switch fabric portion 302 via an edge device (e.g., 310, 318) can be configured to send a data packet to any other peripheral processing device coupled to the switch fabric portion 302 via an edge device.

The edge devices 310 and 318 can be any devices configured to operatively couple peripheral processing devices (e.g., peripheral processing devices 322, 324) to the switch fabric portion 302. In some embodiments, for example, the edge devices 310 and 318 can be access switches, input/output modules, top-of-rack devices and/or the like. Edge device 310 is schematically shown as a source edge device and edge device 318 is schematically shown as a destination edge device for illustration purposes only. Structurally, the edge devices 310 and 318 can each function as a source edge device and a destination edge device. Accordingly, the edge devices 310 and 318 can each send data to and receive data from the switch fabric portion 302.

In this example embodiment, edge device 310 can be coupled to any number of modules of a first stage of a switch fabric, and edge device 318 can be coupled to any number of third stage modules of a switch fabric. Additionally, while shown in FIG. 3 as being operatively coupled to a single switch fabric portion 302, as described in further detail herein, the edge devices 310, 318 can be operatively coupled to any number of switch fabrics, similar to switch fabric portion 302. In some embodiments, for example, the edge device 310 can be both coupled to the first stage module 312 associated with the first stage of the switch fabric portion 302 and a module (not shown in FIG. 3) associated with a first stage of a second switch fabric (not shown in FIG. 3). In such embodiments, the edge device 310 can send data to either the first stage module 312 or the module associated with the first stage of the second switch fabric.

Figure 4:
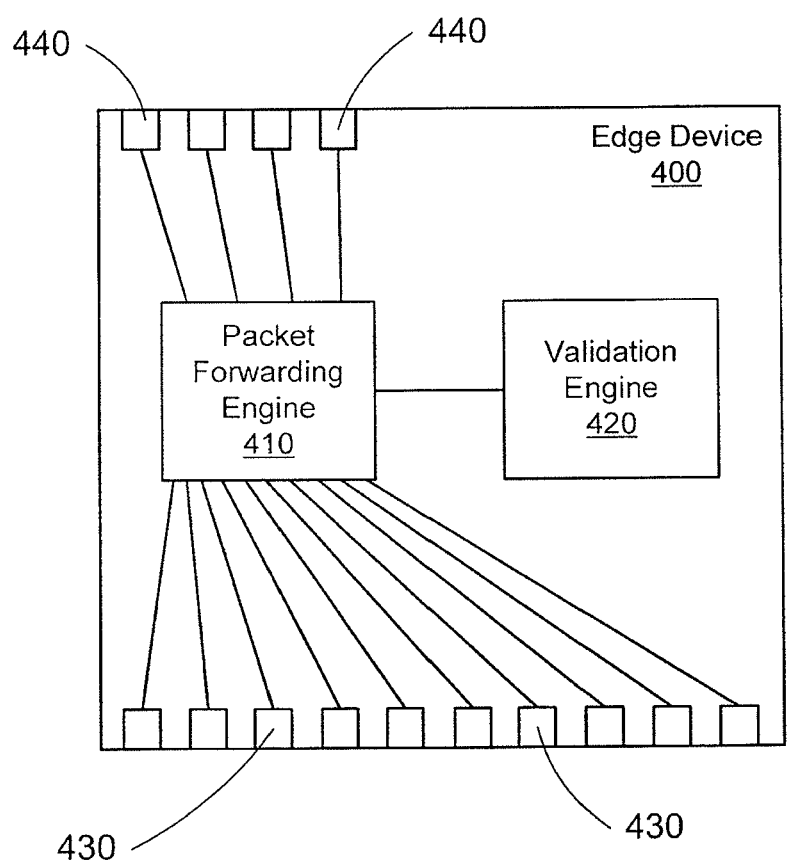
FIG. 4 is a schematic illustration of an edge device of a switch fabric system, according to another embodiment.

FIG. 4 is a schematic illustration of an edge device 400 of a switch fabric system, according to another embodiment. The edge device 400 can be similar to the edge device 310 and the edge device 318. Accordingly, the edge device 400 can be operatively coupled to one or more peripheral processing devices and to one or more switch fabrics.

The edge device 400 includes a packet forwarding engine 410, a validation engine 420, ports 430, and ports 440. Ports 430 can be any suitable ports configured to operatively couple the edge device 400 to peripheral processing devices. Similarly, ports 440 can be any suitable ports configured to operatively couple the edge device 400 to one or more switch fabrics. Accordingly, the edge device 400 can send data to and/or receive data from peripheral processing devices-via ports 430. Similarly, the edge device can send data to and/or receive data from one or more switch fabrics via ports 440. While the edge device 400 includes ten ports 430 and four ports 440, in other embodiments, the edge device can include any number of ports 430 and/or ports 440.

The packet forwarding engine 410 can be configured to prepare a data packet to enter a switch fabric (e.g., switch fabric portion 302 of FIG. 3). For example, the packet forwarding engine 410 can be configured to forward, classify, and/or modify the packet encapsulation of a data packet prior to sending the data packet to a switch fabric. In some embodiments, a data packet (e.g., sent to the edge device 400 from a peripheral processing device) can include a payload portion and a header portion. The payload portion can include data to be sent to a destination peripheral processing device (e.g., peripheral processing device 324 of FIG. 3). The header portion (also referred to herein as "header") can include identifying information. In some embodiments, for example, the header can include at least a portion of an IP 5-tuple associated with the source and destination peripheral processing devices (e.g., 322 and 324, respectively). In such embodiments, for example, the header can include a destination peripheral processing device MAC address, a destination peripheral processing device interne protocol (IP) address, a source peripheral processing device MAC address, a source peripheral processing device IP address and/or a transfer protocol identifier. In the example embodiment of FIG. 3, the destination peripheral processing device MAC address and the destination peripheral processing device IP address can be associated with peripheral processing device 324, and the source peripheral processing device MAC address and the source peripheral processing device IP address can be associated with peripheral processing device 322.

In some embodiments, the packet forwarding engine 410 can use a source identifier (e.g., source MAC address, IP address, etc.), a destination identifier (e.g., source MAC address, IP address, etc.) and/or any other information from the data packet to forward the data packet. Such information can be used to determine to which switch fabric and/or port within a switch fabric to send the data packet (e.g., using a lookup table, a hash function, etc.) and/or to route the data packet through a switch fabric. Similarly, the packet forwarding engine 410 can be configured to prepare a data packet received from a switch fabric (via a port 440) to be sent to a peripheral processing device (via a port 430).

In some embodiments, the packet forwarding engine 410 can also append a source edge device identifier and/or a destination edge device identifier to the data packet. Such information can be used in conjunction with a lookup table to route the data packet through a switch fabric as shown and described in U.S. patent application Ser. No. 12/607,162, filed on Nov. 18, 2009, entitled "Methods and Apparatus Related to a Distributed Switch Fabric," which is incorporated herein by reference in its entirety. Using such source and destination specific information in conjunction with a lookup table and/or a hash function to route data packets through a switch fabric can ensure that each data packet originating from a particular source (e.g., peripheral processing device 322) to be sent to a particular destination (e.g., peripheral processing device 324) will be sent through the switch fabric (e.g., switch fabric portion 302) via the same path (e.g., through the same modules associated with each stage of the switch fabric portion 302). In other embodiments, each data packet and/or cell originating from a particular source to be sent to a particular destination can be sent through the switch fabric via any number of different paths.

The packet forwarding engine 410 can also be configured to recognize different types of packets received from the switch fabric (i.e., via ports 440). In some embodiments, for example, the packet forwarding engine 410 can identify and send data packets to a peripheral processing device operatively coupled to a port 430. Additionally, as described in further detail herein, in some embodiments, the packet forwarding engine 410 can identify and send validation packets received from the switch fabric to the validation engine 420. As such, validation packets can have a packet type identifier in a header that is different from a packet type identifier associated with a data packet.

The validation engine 420 of the edge device 400 can be configured to define, send, receive and/or process validation packets. As described in further detail herein, such validation packets can be used to validate the paths through one or more switch fabrics between the edge device 400 and another edge device (not shown in FIG. 4). For example, the validation engine 420 can be configured to define a number of validation packets equal to the number of data paths between the edge device 400 and another edge device. In the example shown in FIG. 3, for example, a validation engine of the source edge device 310 can define three validation packets (i.e., one for each of the data paths 323, 325, 327). Accordingly, a first validation packet can be used to validate the path 323, a second validation packet can be used to validate the path 325, and a third validation packet can be used to validate the path 327.

The validation engine 420 of the edge device 400 can also be configured to receive validation packets from another edge device. More specifically, when the packet forwarding engine 410 receives a validation packet from a switch fabric (i.e., via a port 440), the packet forwarding engine 410 can send the validation packet to the validation engine 420. The validation engine 420 can parse the validation packet to determine the source edge device. The validation engine 420 can validate the data paths between the edge device 400 and the source edge device by comparing a number of validation packets received with a number of validation packets expected. Additionally, in some embodiments, the validation engine 420 can parse the validation packet for a route identifier and/or serial number. Such a route identifier and/or serial number can uniquely identify a route between the source edge device and the edge device 400 (acting as a destination edge device in this example). Using the route identifier and/or serial number, the validation engine can validate a specific route between the source edge device and the edge device 400.

Returning to FIG. 3, in use, the peripheral processing device 322 can send a data packet to the edge device 310. Using the information contained within the header of the data packet, a packet forwarding engine of the edge device 310 (e.g., similar to packet forwarding engine 410 of FIG. 4) can determine to which first stage module to send the data packet, for example, in a switch fabric having multiple first stage modules. In some embodiments, for example, the packet forwarding engine of the edge device 310 can use a hash function using as inputs portions of, a header value, such as, for example, the MAC address of the destination peripheral processing device 324, the IP address of the destination peripheral processing device 324, the MAC address of the source peripheral processing device 322, the IP address of the source peripheral processing device 322, the destination edge device 318 identifier, the source edge device 310 identifier and/or the transfer protocol identifier to determine to which module (e.g., which first stage module) to send the data packet. In other embodiments, the packet forwarding engine of the edge device 310 can use a lookup table, a routing table and/or the like to determine to which module to send the data packet.

After the first stage module 312 receives the data packet, the first stage module 312 can make a determination as to which second stage module 314, 314', 314" to send the data packet. In some embodiments, for example, the first stage module 312 can use a hash function using as an input(s) a portion of a header value such as, for example, a destination identifier and/or a source identifier, as described above for edge device 310. Based on the input(s), the hash function can determine to which second stage module 314, 314', 314" to forward the data packet. The second stage module 314, 314', 314" can similarly use a hash function to forward the data packet to the third stage module 316. Using the destination edge device 318 identifier, the third stage module 316 can forward the data packet to the destination edge device 318. Using the destination peripheral processing device 324 identifier, a packet forwarding engine of the edge device 318 can then forward the data packet to the destination peripheral processing device 324. In other embodiments, the modules within the switch fabric can use a lookup table, a routing table and/or the like to determine where to forward the data packet.

During operation of the switch fabric system 300, it may be desirable to validate the switch fabric system 300 to ensure that a data packet sent from a source edge device (e.g., 310) reaches the desired destination edge device (e.g., 318) through any of possible paths (e.g., paths 323, 325, 327) that that data packet can be sent to reach the destination edge device. Because of the multiple possible paths that a data packet can be sent to reach a particular destination edge device within such a distributed switch fabric system (e.g., 300), if a validation packet is sent via only one of the paths 323, 325, 327, any possible failures within the other possible paths through the switch fabric system 300 to reach the destination edge device will not be identified. To address this issue, the switch fabric system 300 includes an OAM mechanism (e.g., validation mechanism or validation process) that includes sending a validation packet through each of the possible paths of the switch fabric system 300 through which a validation packet can be sent from a source edge device 310 to a destination edge device 318. The validation process can identify any failures within those possible paths of the validation packet within the switch fabric system 300.

More specifically, a validation engine of the edge device 310 (e.g., similar to validation engine 420 of FIG. 4) can define a number of validation packets equal to the number of data paths between the source edge device 310 and the destination edge device 318. Accordingly, because three different paths exist between the edge device 310 and the edge device 318, the validation engine of the source edge device 310 can define three validation packets. Accordingly, a first validation packet can be used to validate the path 323, a second validation packet can be used to validate the path 325, and a third validation packet can be used to validate the path 327.

Each validation packet can include a payload portion and a header portion. The payload portion can include test data to be sent between the source edge device 310 and the destination edge device 318. In some embodiments, the payload portion can also include a checksum value. As described in further detail herein, the destination edge device 318 can verify the integrity of the test data in a validation packet using the checksum value.

The header portion of a validation packet can be defined such that the validation packet is routed to the edge device 318 via a specified path. For example, if the packet forwarding engine of the source edge device 310 as well as each module within a switch fabric portion 302 uses a hash function to route data packets to the destination edge device 318, the validation engine of the edge device 310 can use a reverse hash lookup to determine the header values to include in the header of a validation packet. In the example shown in FIG. 3, for example, a validation engine of the source edge device 310 can query a reverse hash lookup table for one or more header values (e.g., source MAC address, source IP address, destination MAC address, destination IP address, etc.) that cause the switch fabric portion 302 to route the validation packet via the data path 323. The source edge device 310 can then define the header portion of a validation packet to include such value(s). Similarly, the header of a second validation packet and the header of a third validation packet can be based on a reverse hash lookup of the header values that cause the switch fabric portion 302 to route a data packet via the data path 325 and the data path 327, respectively. When the first validation packet is sent to the switch fabric portion 302, the switch fabric portion 302 routes the first validation packet to the edge device 318 via the path 323. Similarly, when the second validation packet or the third validation packet is sent to the switch fabric portion 302, the switch fabric routes the second validation packet or the third validation packet to the edge device 318 via the path 325 or the path 327, respectively.

A packet forwarding engine of the edge device 318 can receive the validation packets and determine that they are validation packets (e.g. and not data packets). As discussed above, such a determination can be based on an identifier in a header of the validation packets. In some embodiments, the identifier in the header can be an invalid EtherType in an Ethernet frame and/or any other type of value in the packet. The packet forwarding engine of the edge device 318 can then send the validation packets to a validation engine of the edge device 318.

The validation engine of the edge device 318 can be pre-programmed (or access previously stored information) to identify the number of data paths between the edge device 310 and the edge device 318 (e.g., three). Accordingly, the edge device 318 can expect to receive that number of validation packets (e.g., three) when the edge device 310 sends the validation packets. The validation engine of the edge device 318 can compare the number of validation packets received (e.g., within a time period as determined by a timer at the edge device 318) to the expected number of validation packets. If the number of validation packets received within the time period is less than the expected number of validation packets, the validation engine of the edge device 318 can determine that an error exists within a data path. In some embodiments, if a validation packet is not received within the time period, the validation engine of the edge device 318 can assume that an error occurred.

In other embodiments, each validation packet can include a path identifier that identifies the data path between the edge device 310 and the edge device 318 via which the validation packet will be sent. The validation engine of the edge device 318 can parse each validation packet for a path identifier. Using the path identifiers, the validation engine of the edge device 318 can determine which paths are functional. Additionally, if the validation engine fails to receive a validation packet having a path identifier of a path within a time period, the validation engine can determine that an error exists in the path associated with that path identifier. Accordingly, each path 323, 325, 327 between the edge device 310 and the edge device 318 can be validated.

The validation engine of the edge device 318 can be configured to notify the edge device 310 of errors within one or more of the paths 323, 325, 327. In some embodiments, for example, the validation engine of the edge device 318 can send an error signal to the edge device 310 via an out-of-band control plane connection (e.g., a control plane path not collocated with the paths 323, 325, 327 of the data plane). Using an out-of-band control plane connection allows the error signal to bypass the data plane paths and any errors within the data plane. Additionally, because the control plane is not collocated and/or using the same physical connections as the data plane, the error signal can be sent between the edge device 318 and the edge device 310 faster and without disrupting or slowing the transfer of data packets within the data plane (e.g., across paths 323, 325, 327 for data traffic from edge device 318 to edge device 310).

In other embodiments, the edge device 318 can send the error signal to the edge device 310 via a path 323, 325, 327 other than the path 323, 325, 327 that failed. For example, in some embodiments, a first stage module can be collocated with each third stage module and vice versa (e.g., located on the same ASIC). Accordingly, the first stage module 312 can be collocated with a third stage module and the third stage module 316 can be collocated with a first stage module (not shown in FIG. 3 and, e.g., associated with traffic from edge device 318 to edge device 310). If the validation engine of the edge device 318 determines that the path 327 has an error but that the paths 323 and 325 are operating correctly, the validation engine of the edge device 318 can send the error signal via one of the paths 323 or 325 (i.e., via a first stage module collocated with the third stage module 316, a second stage module 314 or 314', and a third stage module collocated with the first stage module 312). In such embodiments, the error signal is sent via a data path 323 or 325 that is operating correctly.

In still other embodiments, the edge device 318 can broadcast the error signal to the edge device 310 over all of the paths between the edge device 318 and the edge device 310. More specifically, the edge device 318 can send the error signal to the edge device 310 via all three paths 323, 325, 327. Accordingly, if an error was detected on the path 327, the edge device 310 can still receive the error signal via the paths 323 and 325. More specifically, a high probability exists that the edge device 310 will receive one of the error signals.

In response to receiving the error signal, the edge device 310 can take corrective action. In some embodiments, for example, the packet forwarding engine of the edge device 310 can refrain from sending data packets on a link with an error. In such embodiments, the packet forwarding engine can analyze a packet (e.g., using a reverse hash lookup) to determine that it will be sent via the link with an error. In such an instance, the packet forwarding engine can amend the values in the header and/or append an additional header to ensure that the packet is sent to the edge device 318 via a path without an error. In other embodiments, any other suitable corrective action can be taken by the edge device 310.

In some embodiments, the validation engine at the edge device 310 or the edge device 318 can analyze the errors in the system (e.g., the validation packets and/or the error signals) to determine a module and/or link at which the failure occurred. For example, if none of the validation packets (i.e., sent on paths 323, 325, 327) are received at the edge device 318, the edge device 318 can infer that either the first stage module 312 or the third stage module 316 (or one of the links between the edge devices 310, 318 and the first stage module 312 and the third stage module 316, respectively) is not operating correctly. Accordingly, the edge device 310 (i.e., in response to an error signal from the edge device 318) can suspend sending data packets to the edge device 318 through the switch fabric portion 302. Similarly, if only the validation packet sent via the path 327 is not received at the edge device 318, the edge device 318 can infer that the second stage module 314", the link connecting the second stage module 314" to the first stage module 312, or the link connecting the third stage module 316 to the second stage module 314" is not operating correctly. Accordingly, in response to an error signal from the edge device 318, the edge device 310 can suspend sending data packets to the edge device 318 via the path 327. Such an analysis allows the edge device 310 to take the most efficient remedial measures without suspending all data traffic through the switch fabric portion 302.

In some embodiments, such analysis can be performed by a central controller (not shown in FIG. 3) instead of and/or in addition to the validation engine at the edge device 310 and/or the validation engine at the edge device 318. Such a central controller can store a map of the topology of the switch fabric system 300. The validation engine at the edge device 318 can send the received validation packets to the central controller for analysis. Similarly, the validation engines at the other edge devices of the switch fabric system 300 can send the validation packets that they received to the central controller. Because the central controller stores a map of the topology of the switch fabric system 300 and because the central controller receives the validation packets from the edge devices of the switch fabric system 300, the central controller can define corrective action that accounts for the detected errors in the switch fabric system 300. Accordingly, the errors in the switch fabric system 300 can be accounted for and remedied in an efficient manner. After the central controller performs the analysis, the central controller can send a signal including instructions for the corrective action to each edge device of the switch fabric system 300 that is to be affected by the corrective action.

In some embodiments, the edge device 310 can periodically send validation packets to the edge device 318. In such embodiments, for example, the validation engine of the edge device 310 can define and send a validation packet via each path 323, 325, 327 once per time period (e.g., once per second). Accordingly, the edge devices 310, 318 can continuously monitor the data paths between the edge devices 310, 318.

In some embodiments, the validation engine of the edge device 310 can include a series number in each validation packet (e.g., within a header of the validation packets). For example, each time the validation engine of the edge device 310 defines and sends validation packets to the edge device 318, the validation engine can increment the series number by one. For example, the first validation packets sent to the edge device 318 can include a series number of one, the second validation packets sent to the edge device 318 can include a series number of two, and so on. Accordingly, the validation engine of the edge device 318 can expect to receive three validation packets (i.e., one validation packet per data path 323, 325, 327) per series. If the validation engine of the edge device 318 fails to receive successive validation packets for a data path (e.g., the validation engine receives a validation packet having a series number of one and three but not two for the data path 323), the edge device 318 can infer that an error occurred in the data path 323.

Figure 5:
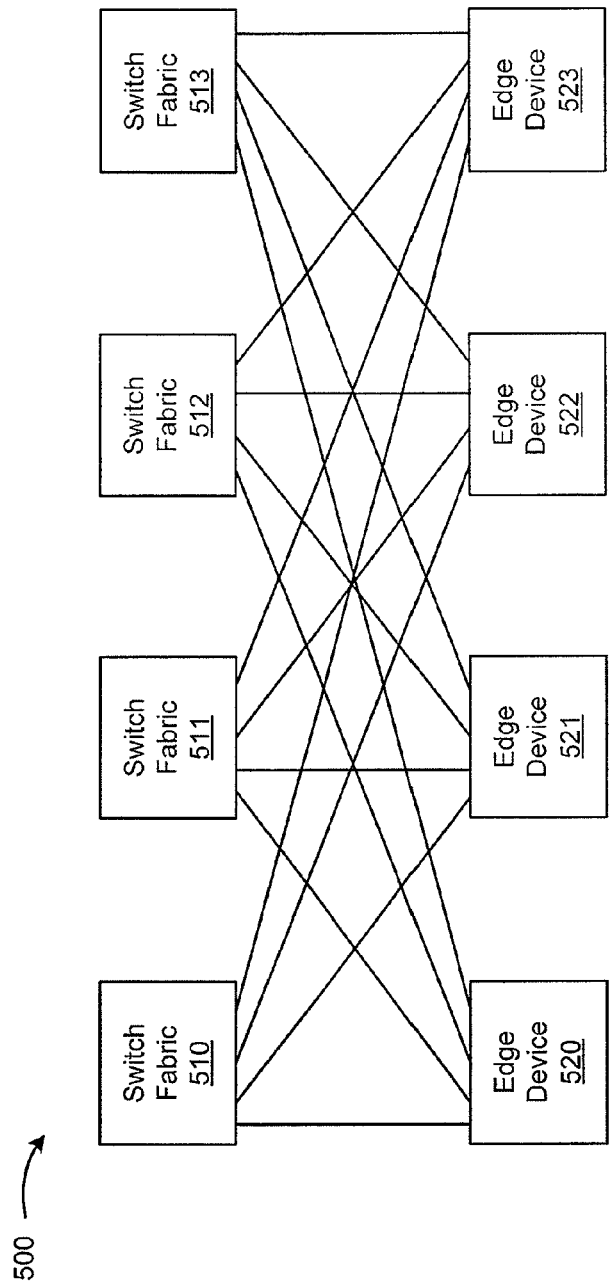
FIG. 5 is a schematic illustration of a portion of a switch fabric system having multiple switch fabrics, according to another embodiment.

While the edge devices 310 and 318 are shown in FIG. 3 as being operatively coupled to a single switch fabric portion 302, in other embodiments, the edge devices can be operatively coupled to multiple switch fabrics. FIG. 5, for example, is a schematic illustration of a portion of a switch fabric system 500 having multiple edge devices 520-523 operatively coupled to multiple switch fabrics 510-513, according to another embodiment. Each edge device 520-523 can be structurally and functionally similar to the edge device 400 shown and described in FIG. 4. Accordingly, each edge device 520-523 can include a packet forwarding engine that provides an interface between one or more peripheral processing devices (not shown in FIG. 5) and the switch fabrics 510-513. Additionally, each edge device 520-523 can include a validation engine similar to the validation engine 420, shown and described with respect to FIG. 4.

Each switch fabric 510-513 can be similar to the switch fabric 200 shown and described with respect to FIG. 2. Accordingly, each switch fabric 510-513 can provide multiple paths between each edge device 520-523. For example, the edge device 520 can send data to and/or receive data from the edge device 521 through multiple data paths within each switch fabric 510-513. In some embodiments, for example, each switch fabric 510-513 can include eight first stage modules, eight second stage modules, and eight third stage modules. Accordingly, in such embodiments, each switch fabric 510-513 can include eight data paths between each edge device 520-523. For example, the switch fabric 510 includes eight data paths between the edge device 520 and the edge device 521. Similarly stated, there are eight data paths between the edge device 520 and the edge device 521 that include the switch fabric 510. For another example, the switch fabric 511 includes eight data paths between the edge device 520 and the edge device 521. Similarly stated, there are eight data paths between the edge device 520 and the edge device 521 that include the switch fabric 511. Accordingly, the switch fabric system 500 includes 32 data paths (i.e., four switch fabrics 510-513 each having eight data paths) between each edge device 520-523 and every other edge device 520-523.

Each edge device 520-523 can validate the data paths between itself and the other edge devices 520-523 by defining and sending validation packets to the other edge devices 520-523, similar to the validation packets described with respect to FIGS. 3 and 4. For example, a validation engine (not shown in FIG. 5) of the edge device 520 can define 32 validation packets to be sent to each of the edge devices 521-523 per series. More specifically, and as described above, the validation engine of the edge device 520 can query a reverse hash database to provide values for the headers of the validation packets such that one validation packet is routed from the edge device 520 to the other edge devices 521-523 via each of the possible data paths. For example, the edge device 520 can validate the data paths between the edge device 520 and the edge device 521 by defining eight validation packets to be routed through the switch fabric 510 (one for each path within the switch fabric 510), eight validation packets to be routed through the switch fabric 511, eight validation packets to be routed through the switch fabric 512, and eight validation packets to be routed through the switch fabric 513.

The packet forwarding engine of the edge device 521 can receive and send the validation packets to a validation engine of the edge device 521. As described above, the validation engine of the edge device 521 can compare a number of validation packets received (i.e., within a given time period) with a same series number with a number of validation packets that the validation engine of the edge device 521 expected to receive (i.e., 32). If the number of validation packets received is less than the number of validation packets expected, the edge device 521 can send an error signal to the edge device. 520 indicating an error.

In some embodiments, the validation engine of the edge device 521 can analyze the validation packets prior to sending the error signal to the edge device 520. For example, if the validation engine of the edge device 521 determines that the validation packet(s) sent through the switch fabric 511 were not received, the validation engine of the edge device 521 can provide an indication of this within the error signal. Based on such an error signal, the edge device 520 can avoid sending data packets to the edge device 521 via the switch fabric 511. For another example, if the validation engine of the edge device 521 determines that the validation packet sent through one second stage module in the switch fabric 513 was not received, the validation engine of the edge device 521 can provide an indication of this within the error signal. Based on such an error signal, the edge device 520 can avoid sending data packets to the edge device 521 via that second stage module in the switch fabric 513. Accordingly, the edge device 520 can modify sending data packets based on the validation packets received and/or not received by the edge device 521.

Similarly, the edge device 520 can send validation packets on the data paths between the edge device 520 and the edge devices 522 and 523 in a similar manner. Moreover, each edge device 521-523 can similarly send validation packets on the data paths to the other edge devices 520-523.

In some embodiments and as described with respect to FIG. 3, analysis can be performed by a central controller (not shown in FIG. 5) instead of and/or in addition to the validation engines at the edge devices 520-523. Such a central controller can store a map of the topology of the switch fabric system 500. The validation engine at the edge devices 520-523 can send received validation packets to the central controller for analysis. Because the central controller stores a map of the topology of the switch fabric system 500 and because the central controller receives the validation packets from the edge devices 520-523 of the switch fabric system 500, the central controller can define corrective action that accounts for the detected errors in the switch fabric system 500. For example, if none of the validation packets sent through the switch fabric 512 are received at their destination edge devices 520-523, the central controller can instruct the edge devices to not send data packets to the switch fabric 512. For another example, if the validation packets sent through a specific second stage module of the switch fabric 511 are not received at their destination edge devices 520-523, the central controller can instruct the edge devices 520-523 to not send data packets to that second stage module of switch fabric 511. Accordingly, the errors in the switch fabric system 500 can be accounted for and remedied for the switch fabric system 500 and in an efficient manner. Using a central controller also can allow a larger data sample to be used (e.g., data from all of the edge devices 520-523 of the switch fabric system 500) when defining corrective action for the switch fabric system 500. After the central controller performs the analysis, the central controller can send a signal including instructions for the corrective action to each edge device 520-523 of the switch fabric system 500 that is to be affected by the corrective action.

Figure 6:
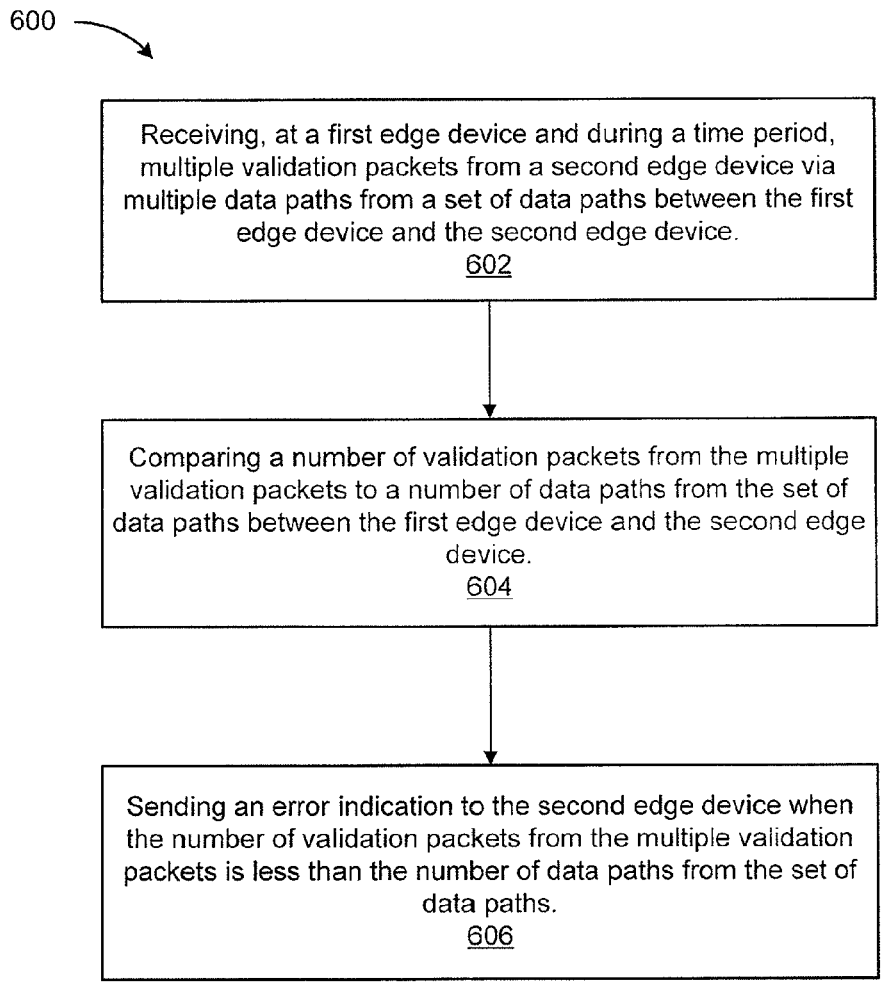
FIG. 6 is a flow chart illustrating a method of detecting errors within a switch fabric system, according to an embodiment.

FIG. 6 is a flow chart illustrating a method 600 of detecting errors within a switch fabric system, according to an embodiment. The method 600 includes receiving, at a first edge device and during a time period, multiple validation packets from a second edge device via multiple data paths from a set of data paths between the first edge device and the second edge device, at 602. In some embodiments, the data paths are within one or more distributed multi-stage switch fabrics. In some embodiments, one validation packet can be received via each data path from the multiple data paths. More specifically, one validation packet can be configured to validate each data path from the set of data paths.

A number of validation packets from the multiple validation packets is compared to a number of data paths from the set of data paths between the first edge device and the second edge device, at 604. If the number of validation packets from the multiple validation packets is less than the number of data paths from the set of data paths, not all of the validation packets sent from the second edge device to the first edge device were received at the first edge device. Accordingly, the first edge device can determine that an error exists within at least one of the data paths from the set of data paths.

An error indication is sent to the second edge device when the number of validation packets from the multiple validation packets is less than the number of data paths from the set of data paths, at 606. In some embodiments, the error indication includes an indication of which data paths have an error. Based on the error indication, the second edge device can avoid sending data packets to the first edge device via the data paths having errors.

While various embodiments have been described above, it should be understood that they have been presented by way of example only, and not limitation. Where methods described above indicate certain events occurring in certain order, the ordering of certain events may be modified. Additionally, certain of the events may be performed concurrently in a parallel process when possible, as well as performed sequentially as described above.

While shown and described above with respect to FIG. 5 as each edge device 520-523 including a single connection with each switch fabric 510-513, in other embodiments, one or more of the edge devices 520-523 can include multiple connections with a switch fabric 510-513. In some embodiments, for example, each edge device 520-523 can include two or more connections with each switch fabric 510-513. In yet other embodiments, each switch fabric 510-513 is not connected to each edge device 520-523. For example, edge device 520 can be coupled to the switch fabrics 510-512 but not switch fabric 513.

While shown and described above as an edge device avoiding sending data packets to another edge device via a particular path based on an error signal, in other embodiments, a central controller can instruct a module of a switch fabric immediately preceding the inoperable module to avoid sending a data packet to that inoperable module. For example, if the central controller determines that a particular second stage module is inoperable, the first stage modules configured to send data packets to that second stage module can be instructed to route data packets to alternative second stage modules. For another example, if the central controller determines that a particular first stage module is inoperable, the edge device(s) configured to send data packets to that first stage module can be instructed to route data packets to an alternative first stage module (in the same switch fabric or an alternative switch fabric). In such embodiments, the functionality associated with selecting alternate routes is not concentrated at the edge device(s) but is rather distributed throughout the edge device(s) and the switch fabric(s).

In some embodiments, the validation engines of the edge devices are configured to only validate certain portions of the switch fabric system. For example, the validation engines of the edge devices 520-523 of FIG. 5 can define validation packets to validate the data paths between the edge devices 520-523 and the switch fabrics 510-513. In such an example, the validation engine of each edge device 520-523 defines four validation packets per series and sends one validation packet to each switch fabric 510-513. If the destination edge devices 520-523 receive the validation packets, it can be inferred that the links between the edge devices 520-523 and the switch fabrics 510-513 are operational. Such validation packets, however, do not verify every data path within the switch fabrics 510-513. Accordingly, while the validation uses fewer validation packets, the validation is less granular than the validation schemes described above.

In some embodiments, for example, a destination edge device receiving validation packets can send the validation packets back to the source edge device. More specifically, instead of analyzing the received validation packets and sending an error signal, the destination edge device can send (e.g., reflect) the received validation packets back to the source edge device via the same data path over which the validation packets were sent from the source edge device to the destination edge device. In such embodiments, for example, the destination identifier(s) and the source identifier(s) in the original data packet can be set as the source identifier(s) and the destination identifier(s) in the reflected data packet, respectively. The source edge device can then analyze the received validation packets to determine errors in the data paths.

In some embodiments, a switch module can include multiple lookup tables. For example, different hash lookup tables can be defined for different types of data packets (e.g., known unicast, unknown unicast, known multicast, unknown multicast). The different types of data packets can have different paths through the switch fabric system between a source edge device and a destination edge device. Thus, for example, a first hash lookup table can be used for a unicast validation packet, and a second hash lookup table can be used for a multicast validation packet. Each lookup table can define different header values to append to the validation packet based on the type of validation packet. A hash lookup table can also be defined for other types of data packets including IP traffic and/or Fibre Channel over Ethernet (FCOE) traffic.

In some embodiments, a validation process as described herein can be used on a periodic basis to monitor and verify the OAM operations. In such an embodiment, the destination edge device can be configured to expect a validation packet(s) on a periodic schedule. If the destination edge device does not receive a validation packet(s) as scheduled, the destination edge device can determine that a failure exists within all the possible paths from the source edge device to the destination edge device.

In some embodiments, a validation process as described herein can be used as a diagnostic tool initiated to perform a one-time verification test. For example, in some embodiments, the validation process can be initiated to test a specific path of a data packet through a switch fabric system between a first edge device and a destination (e.g., a particular module within the switch fabric, or a particular edge device). In some embodiments, a user can provide a flow definition in a header of the validation packet to specify, for example, the path to be validated and/or other flow controls such as, for example, packet size, priority and/or payload byte pattern. In some embodiments, the switch fabric system can include a control plane, and the source edge device can send a signal over the control plane to the destination edge device to indicate that a validation packet will be sent. Thus, in such an embodiment, if the destination edge device does not receive the validation packet over the data plane, the destination edge device will know that a failure exists within the possible paths within the data plane from the source edge device to the destination edge device.

In some embodiments, a validation packet can include a Time-To-Live (TTL) header field that can be used to prevent a validation packet from being caught in a loop and taking up resources (e.g., bandwidth) in the switch fabric system. For example, in some situations, a failure in the switch fabric system can cause a data packet to continually loop through a portion of the switch fabric system. A validation packet can include a TTL header with an initial TTL value of N that is greater than the number of physical hops M in the switch fabric system between the source edge device and the destination edge device. For example, in the switch fabric system 300 illustrated in FIG. 3, the switch fabric system 300 includes 4 physical hops (a first hop from the source edge device to the first stage module, a second hop from the first stage module to the second stage modules, a third hop from the second stage modules to the third stage module, and a fourth hop from the third stage module to the destination edge device). In such an embodiment, the TTL value N will initially be greater than 4.

As the validation packet is sent between modules of the switch fabric system, the TTL value can be decremented at each physical hop. Thus, if the validation packet is sent through the switch fabric system and reaches the destination edge device, the TTL value should be greater than zero. If the validation packet gets caught in a loop, for example looping back through a module, each time the validation packet is sent back to that same module, the TTL value will be decremented until the TTL value is equal to zero. Each module in the switch fabric system can check the TTL field to determine the TTL value for that validation packet. When the TTL value is equal to zero, the module will discard and/or drop the validation packet. Thus, that validation packet will not reach the destination edge device. In such a situation, the destination edge device can determine that the correct number of validation packets were not received and that a failure in the switch fabric system has occurred as previously described.

In other embodiments, a TTL value can be time based. In such embodiments, for example, each validation packet can be configured to be alive for a predetermined amount of time (e.g., one second). Each physical hop can compare a current time with an origination time stamp of the validation packet. If a difference in the current time and the origination time of the validation packet is greater than the TTL value, the validation packet can be discarded. In still other embodiments, the TTL value of a validation packet can be based on any suitable metric.

While switch fabric portion 302 shown and described above is a three-stage switch fabric, in other embodiments of a switch fabric system a switch fabric can include any number of stages. In some embodiments, for example, the switch fabric can be a five stage switch fabric similar to the switch fabric shown and described in co-pending U.S. patent application Ser. No. 12/345,500, filed on Dec. 29, 2008, and entitled System Architecture for a Scalable and Distributed Multi-Stage Switch Fabric," and co-pending U.S. patent application Ser. No. 12/345,502, filed on Dec. 29, 2008, and entitled "Methods and Apparatus Related to a Modular Switch Architecture," each of which is incorporated herein by reference in its entirety.

Embodiments shown and described above refer to multiple peripheral processing devices, including compute notes, storage nodes, service nodes and routers. In some embodiments, one or more of the compute nodes can be general-purpose computational engines that can include, for example, processors, memory, and/or one or more network interface devices (e.g., a network interface card (NIC)). In some embodiments, the processors within a compute node can be part of one or more cache coherent domains. In some embodiments, the compute nodes can be host devices, servers, and/or so forth. In some embodiments, one or more of the compute nodes can have virtualized resources such that any compute node (or a portion thereof) can be substituted for any other compute node (or a portion thereof) operatively coupled to a switch fabric system.

In some embodiments, one or more of the storage nodes can be devices that include, for example, processors, memory, locally-attached disk storage, and/or one or more network interface devices. In some embodiments, the storage nodes can have specialized modules (e.g., hardware modules and/or software modules) to enable, for example, one or more of the compute nodes to read data from and/or write data to one or more of the storage nodes via a switch fabric. In some embodiments, one or more of the storage nodes can have virtualized resources so that any storage node (or a portion thereof) can be substituted for any other storage node (or a portion thereof) operatively coupled to a switch fabric system.

In some embodiments, one or more of the services nodes can be an open systems interconnection (OSI) layer-4 through layer-7 device that can include, for example, processors (e.g., network processors), memory, and/or one or more network interface devices (e.g., 10 Gb Ethernet devices). In some embodiments, the services nodes can include hardware and/or software (executing on hardware) to perform computations on relatively heavy, network workloads. In some embodiments; the services nodes can perform computations on a per-packet basis in a relatively efficient fashion (e.g., more efficiently than can be performed at, for example, a compute node). The computations can include, for example, stateful firewall computations, intrusion detection and prevention (IDP) computations, extensible markup language (XML) acceleration computations, transmission control protocol (TCP) termination computations, and/or application-level load-balancing computations. In some embodiments, one or more of the services nodes can have virtualized resources so that any service node (or a portion thereof) can be substituted for any other service node (or a portion thereof) operatively coupled to a switch fabric system.

In some embodiments, one or more of the routers can be networking devices operable to connect at least a portion of a switch fabric system (e.g., a data center) to another network (e.g., the global Internet). In some embodiments, for example, a router can enable communication between components (e.g., peripheral processing devices, portions of the switch fabric) associated with a switch fabric system. The communication can be defined based on, for example, a layer-3 routing protocol. In some embodiments, one or more of the routers can have one or more network interface devices (e.g., 10 Gb Ethernet devices) through which the routers can send signals to and/or receive signals from, for example, a switch fabric and/or other peripheral processing devices.

Some embodiments described herein relate to a computer storage product with a non-transitory computer-readable medium (also can be referred to as a non-transitory processor-readable medium) having instructions or computer code thereon for performing various computer-implemented operations. The computer-readable medium (or processor-readable medium) is non-transitory in the sense that it does not include transitory propagating signals per se (e.g., a propagating electromagnetic wave carrying information on a transmission medium such as space or a cable). The media and computer code (also can be referred to as code) may be those designed and constructed for the specific purpose or purposes. Examples of non-transitory computer-readable media include, but are not limited to: magnetic storage media such as hard disks, floppy disks, and magnetic tape; optical storage media such as Compact Disc/Digital Video Discs (CD/DVDs), Compact Disc-Read Only Memories (CD-ROMs), and holographic devices; magneto-optical storage media such as optical disks; carrier wave signal processing modules; and hardware devices that are specially configured to store and execute program code, such as Application-Specific Integrated Circuits (ASICs), Programmable Logic Devices (PLDs), Read-Only Memory (ROM) and Random-Access Memory (RAM) devices.

Examples of computer code include, but are not limited to, micro-code or micro-instructions, machine instructions, such as produced by a compiler, code used to produce a web service, and files containing higher-level instructions that are executed by a computer using an interpreter. For example, embodiments may be implemented using Java, C++, or other programming languages (e.g., object-oriented programming languages) and development tools. Additional examples of computer code include, but are not limited to, control signals, encrypted code, and compressed code.

While various embodiments have been described above, it should be understood that they have been presented by way of example only, not limitation, and various changes in form and details may be made. Any portion of the apparatus and/or methods described herein may be combined in any combination, except mutually exclusive combinations. The embodiments described herein can include various combinations and/or sub-combinations of the functions, components and/or features of the different embodiments described.

What is claimed is:

1. An apparatus, comprising:
a validation engine implemented in at least one of a memory or a processing device, the validation engine implemented within a first edge device not included in a multi-stage switch fabric, the validation engine configured to define a plurality of validation packets, a number of validation packets from the plurality of validation packets being based on a number of data paths from a plurality of data paths across the multi-stage switch fabric and between the first edge device and a second edge device,
the validation engine configured to send each validation packet from the plurality of validation packets to a packet forwarding engine of the first edge device, each validation packet from the plurality of validation packets to cause the packet forwarding engine to send that validation packet to the second edge device via a data path from the plurality of data paths and the second edge device to validate the plurality of data paths across the multi-stage switch fabric and between the first edge device and the second edge device based on a number of received validation packets from the plurality of validation packets.

2. The apparatus of claim 1, wherein the plurality of validation packets is a first plurality of validation packets, the validation engine configured to define a second plurality of validation packets a time period after the first plurality of validation packets is defined, the second plurality of validation packets having a series number greater than a series number of the first plurality of validation packets.

3. The apparatus of claim 1, wherein the validation engine is configured to define a header value for each validation packet from the plurality of validation packets that differs from a header value for each remaining validation packet from the plurality of validation packets, each validation packet from the plurality of validation packets to cause the packet forwarding engine to send that validation packet to the second edge device via a unique data path from the plurality of data paths.

4. The apparatus of claim 1, wherein each data path from the plurality of data paths includes a portion of the multi-stage switch fabric.

5. The apparatus of claim 1, wherein the validation engine is configured to define a header value for each validation packet from the plurality of validation packets based on a reverse hash lookup.

6. The apparatus of claim 1, wherein the validation engine is configured to define a header value for each validation packet from the plurality of validation packets distinct from a header value for each data packet sent from the first edge device to the second edge device via the plurality of data paths.

7. The apparatus of claim 1, wherein the validation engine is configured to receive an error signal from the second edge device in response to the number of received validation packets from the plurality of validation packets being less than the number of data paths from the plurality of data paths.

8. An apparatus, comprising:
a validation engine implemented in at least one of a memory or a processing device, the validation engine configured to receive a plurality of validation packets from an edge device via a set of data paths from a plurality of data paths across a multi-stage switch fabric and between the validation engine and the edge device, the edge device not included in the multi-stage switch fabric, the plurality of validation packets being included in a group of validation packets sent from the edge device based on a number of data paths from the plurality of data paths, the validation engine configured to compare a number of validation packets from the plurality of validation packets received from the edge device to the number of data paths from the plurality of data paths to determine an error at a data path from the plurality of data paths, the validation engine configured to send an indication of the error at the data path from the plurality of data paths to the edge device.

9. The apparatus of claim 8, wherein the validation engine is configured to send the indication of the error at the data path from the plurality of data paths to the edge device, the indication of the error to cause the edge device to suspend sending data packets via the data path from the plurality of data paths in response to the indication of the error.

10. The apparatus of claim 8, wherein the validation engine is configured to send the indication of the error at the data path from the plurality of data paths to the edge device via a control plane connection mutually exclusive from a data plane including the plurality of data paths.

11. The apparatus of claim 8, wherein the validation engine is configured to send the indication of the error at the data path from the plurality of data paths to the edge device via a data path from the set of data paths.

12. The apparatus of claim 8, wherein the validation engine is configured to send the indication of the error at the data path from the plurality of data paths to the edge device via each data path from the set of data paths.

13. The apparatus of claim 8, wherein the validation engine is configured to parse each validation packet from the plurality of validation packets for a checksum value to verify data integrity of that validation packet from the plurality of validation packets.

14. The apparatus of claim 8, wherein each data path from the plurality of data paths includes a portion of the multi-stage switch fabric.

15. The apparatus of claim 8, wherein the validation engine is configured to compare the number of validation packets from the plurality of validation packets received from the edge device to the number of data paths from the plurality of data paths to determine the error at the data path from the plurality of data paths a time period after the validation engine receives a first validation packet from the plurality of validation packets.

16. The apparatus of claim 8, wherein the validation engine determines the error at the data path from the plurality of data paths when a validation packet from the plurality of validation packets is not received on the data path from the plurality of data paths.

17. A non-transitory processor-readable medium storing code representing instructions to cause a processor to:
  receive, at a first edge device and during a time period, a plurality of validation packets from a second edge device via a set of data paths from a plurality of data paths across a multi-stage switch fabric and between the first edge device and the second edge device, the second edge device not included in the multi-stage switch fabric, the plurality of validation packets being included in a group of validation packets sent from the second edge device based on a number of data paths from the plurality of data paths;
  compare a number of validation packets from the plurality of validation packets to the number of data paths from the plurality of data paths; and
  send an error indication to the second edge device when the number of validation packets from the plurality of validation packets is less than the number of data paths from the plurality of data paths.

18. The non-transitory processor-readable medium of claim 17, wherein the code representing instructions to cause the processor to send the error indication includes code representing instructions to cause the processor to send the error indication to the second edge device via a control plane connection mutually exclusive from a data plane including the plurality of data paths.

19. The non-transitory processor-readable medium of claim 17, wherein the plurality of data paths includes a portion of the multi-stage switch fabric.

20. The non-transitory processor-readable medium of claim 17, further comprising code representing instructions to cause the processor to:
  determine that a validation packet from the group of validation packets was not received from the second edge device via a data path from the plurality of data paths,
  the code representing instructions to cause the processor to send the error indication includes code representing instructions to cause the processor to send the error indication to the second edge device, the error indication to cause the second edge device to suspend sending data packets via the data path from the plurality of data paths in response to the error indication.

* * * * *